US008639492B2

(12) United States Patent
Bogsanyl et al.

(10) Patent No.: US 8,639,492 B2
(45) Date of Patent: Jan. 28, 2014

(54) ACCELERATED EXECUTION FOR EMULATED ENVIRONMENTS

(75) Inventors: Francis Bogsanyl, Ottawa (CA); Graeme Johnson, Ontario (CA); Andrew Low, Ontario (CA); Marcel Mitran, Ontario (CA); Ali Sheikh, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 12/869,344

(22) Filed: Aug. 26, 2010

(65) Prior Publication Data

US 2011/0054879 A1    Mar. 3, 2011

(30) Foreign Application Priority Data

Aug. 27, 2009  (CA) .................................. 2675666

(51) Int. Cl.
*G06F 9/455* (2006.01)
*G06F 9/45* (2006.01)
(52) U.S. Cl.
USPC ............................................ 703/26; 718/100
(58) Field of Classification Search
None
See application file for complete search history.

(56) References Cited

U.S. PATENT DOCUMENTS

| | | |
|---|---|---|
| 6,834,391 B2 | 12/2004 | Czajkowski |
| 7,213,098 B2 | 5/2007 | Czajkowski |
| 7,536,688 B2 | 5/2009 | Tene et al. |
| 7,703,108 B2 | 4/2010 | Sanouillet |
| 2006/0107257 A1 | 5/2006 | Ellison |

OTHER PUBLICATIONS

Lin et al. "vCUDA: GPU Accelerated High PErformance Computing in Virtual Machines", IEEE, May 23-29, 2009, 1 pages.*
Gupta et al. "GViM: GPU-accelerated Virtual Machines", ACM, Mar. 31, 2009, pp. 17-24.*
Jeremy Singer, Chris Kirkham, and Ian Watson, Supporting Higher-Order Virtualization, Proceedings of the12th International Workshop on Compilers for Parallel Computers, 2006, pp. 1-15, School of Computer Science, University of Manchester, Oxford Road, Manchester, UK.
Gregorz Czajkowski, Laurent Daynes and Mario Wolczko, Automated and Portable Native Code Isolation: 12th International Symposium on Software Reliability Engineering, 2001, IEEE, Nov. 27-30, 2001, pp. 298-307, California, US.

* cited by examiner

*Primary Examiner* — Suzanne Lo
(74) *Attorney, Agent, or Firm* — Yudell Isidore Ng Russell PLLC (57) ABSTRACT

The illustrative embodiments provide a computer implemented method, apparatus, and computer program product for accelerating execution of a program, written in an object oriented programming language, in an emulated environment. In response to receiving a request for an accelerated communications session from a guest virtual machine in the emulated environment, a native virtual machine is initiated external to the emulated environment but within the computing device hosting the emulated environment. Thereafter, an accelerated communications link is established between the guest virtual machine and the native virtual machine. The accelerated communications link enables a transfer of managed code between the guest virtual machine and the native virtual machine. The managed code is then executed by the native virtual machine.

20 Claims, 6 Drawing Sheets

ACCELERATED EXECUTION FOR EMULATED ENVIRONMENTS

PRIORITY CLAIM

The present application claims benefit of priority under 35 USC §120, §365 to the previously filed Canadian Patent Application No. 2675666 entitled, "Accelerated Execution for Emulated Environments" with a priority date of Aug. 27, 2009. The content of that application is incorporated by reference herein.

BACKGROUND

1. Field of the Invention

The present invention relates generally to an improved data processing system and in particular to a method and apparatus for emulated environments in a data processing system. Still more particularly, the present invention relates to a computer implemented method, apparatus, and computer program product for managing the execution of programs in emulated environments.

2. Description of the Related Art

An emulator is a software program that duplicates the functions of a first system by a second system so that the second system behaves, and sometimes appears, like the first system. Emulators are often used to provide access to scarce or expensive resources or to allow applications written for one environment to run on a different environment. An emulator, which runs on a host system, often has a different architecture or instruction set than the host system. These differences often make the emulation process computationally expensive.

A Java™ virtual machine (JVM) is a set of computer software programs that incorporates "write-once, run anywhere" semantics for Java™ programs that are encoded as .class files. The JVM is typically packaged as a native executable that loads and executes other computer programs and scripts, such as .class files. The Java™ virtual machine utilizes a just-in-time compiler that converts bytecoded Java™ programs into efficient native code at runtime. As a result, the execution of a JVM in an emulated environment often suffers a performance penalty because the creation of the native code at runtime prevents the implementation of executables/shared libraries which the emulator can analyze in advance.

BRIEF SUMMARY

The illustrative embodiments described herein provide a computer implemented method, apparatus, and computer program product for accelerating execution of a program written in an object oriented programming language in an emulated environment. In response to receiving a request for an accelerated communications session from a guest virtual machine in the emulated environment, a native virtual machine is created outside the emulated environment but within a computing device hosting the emulated environment. Thereafter, an accelerated communications link is established between the guest virtual machine and the native virtual machine. The accelerated communications link enables a transfer of managed code between the guest virtual machine and the native virtual machine. The managed code is then executed by the native virtual machine.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
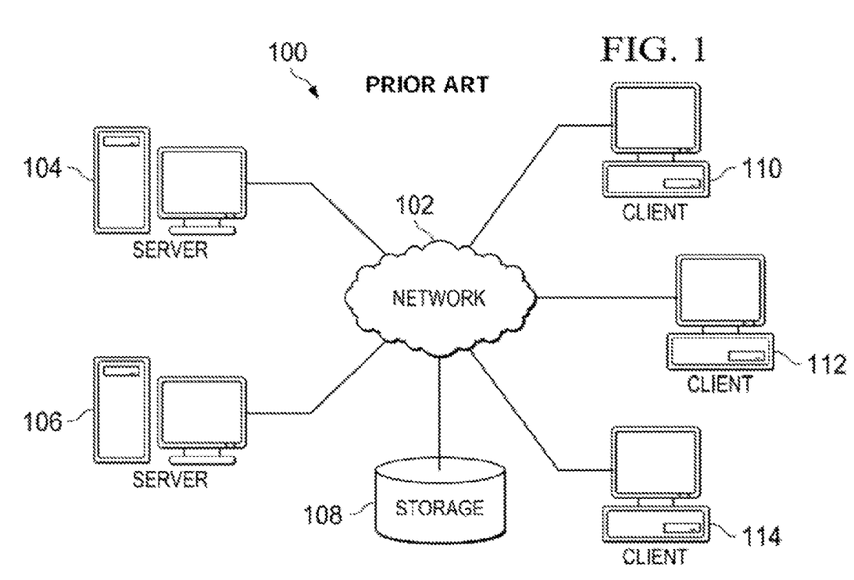
FIG. 1 is a pictorial representation of a network of data processing systems in which illustrative embodiments may be implemented.
Figure 2:
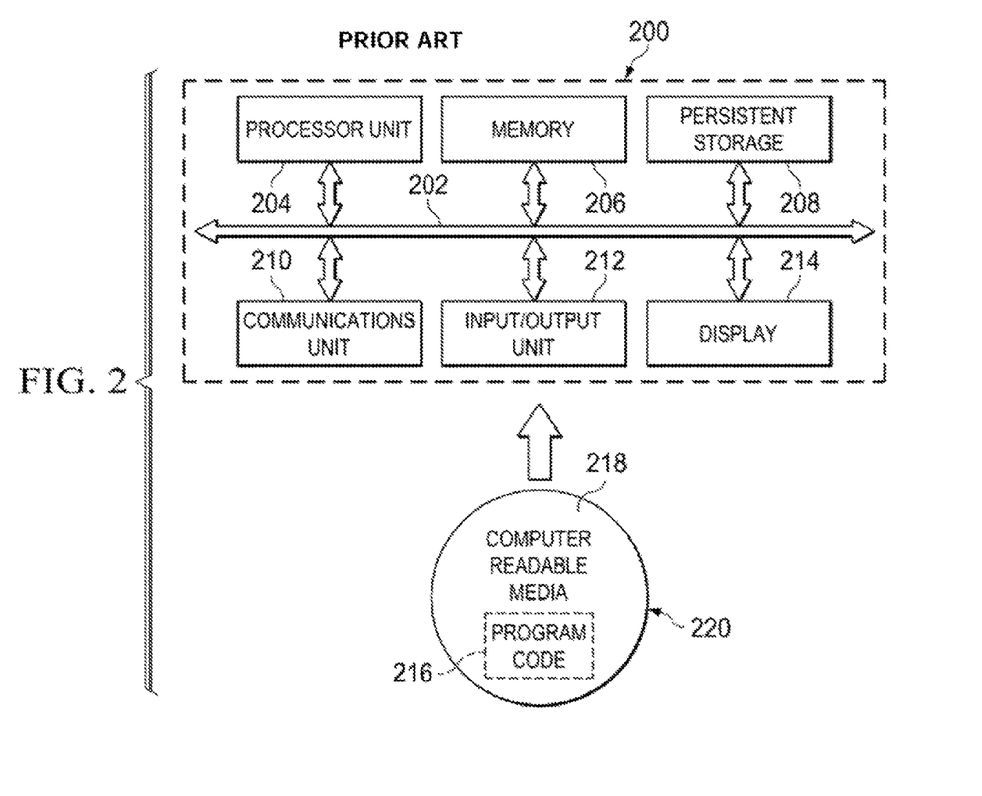
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In an illustrative example, a computing device, such as client 110 in FIG. 1, includes an emulator for creating an emulated environment in which a guest virtual machine executes. The emulator includes an acceleration manager component configured for creating a native virtual machine in the computing device but external to the emulated environment. The guest virtual machine and the native virtual machine are then communicatively coupled using an accelerated communications link. The accelerated communications link is established using connection parameters provided by the acceleration manager.

Execution of Java™ programs in the emulated environment is accelerated by offloading managed code, via the accelerated communications links, from the guest virtual machine to the native virtual machine where the execution of the managed code is free of the execution overhead that is imposed by Java™ code executed in an emulated environment. The managed code is transferred to the native virtual machine as Java™ .class files over the accelerated communications link. Execution of the native code and various I/O requests are still performed by the guest virtual machine.

In a non-limiting embodiment, the virtual machines disclosed herein are Java™ virtual machines. Examples of Java™ virtual machines may include, but are not limited to, J9, Hotspot, Kaffe, and JRockit. J9 is a Java™ virtual machine offered by IBM Corporation. Hotspot is another Java™ virtual machine, offered by Sun Microsystems. Kaffe is an open source Java™ virtual machine offered by Transvirtual Technologies, Inc. JRockit is virtual machine owned by Oracle Corporation.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The execution of a Java™ program in an emulated environment introduces computational overhead that introduces a performance penalty. The performance penalty generally arises from the differences in architecture and/or instruction sets between the emulator and host system. Java™ execution outside of emulated environments proceeds at a faster rate, unencumbered by these differences. Currently used solutions for accelerating the execution of Java™ programs involves the splitting of Java™ program execution to different, distinct physical nodes. The use of different nodes is overly complex and inefficient, particularly for same-machine environments Thus, the embodiments disclosed herein recognize the ability to accelerate the execution of Java™ programs in emulated environments by transparently offloading execution of managed code of a Java™ program to a virtual machine unencumbered by an emulator. In particular, a guest virtual machine, located within the emulated environment, is linked to a native virtual machine, external to the emulated environment. The guest virtual machine delegates the execution of managed code to the native virtual machine, increasing the rate at which the Java™ programs run. The guest virtual machine is responsible for executing at least one of I/O requests and native code. As used herein, the term "at least one of", when used with a list of items means that different combinations of one or more of the items may be used and only one of each item in the list may be needed. For example, "at least one of item A, item B, and item C" may include, for example, without limitation, item A or item A and item B. This example also may include item A, item B, and item C or item B and item C. Thus, the guest virtual machine is responsible for executing I/O requests, native code, or both.

Accordingly, the disclosure provides for a computer implemented method, apparatus, and computer program product to accelerate execution of a program, written in an object oriented programming language, in an emulated environment. In response to receiving a request for an accelerated communications session from a guest virtual machine in the emulated environment, a native virtual machine is created outside the emulated environment but within a computing device hosting the emulated environment. Thereafter, an accelerated communications link is established between the guest virtual machine and the native virtual machine. The accelerated communications link enables a transfer of managed code between the guest virtual machine and the native virtual machine. The managed code is then executed by the native virtual machine.

Figure 3:
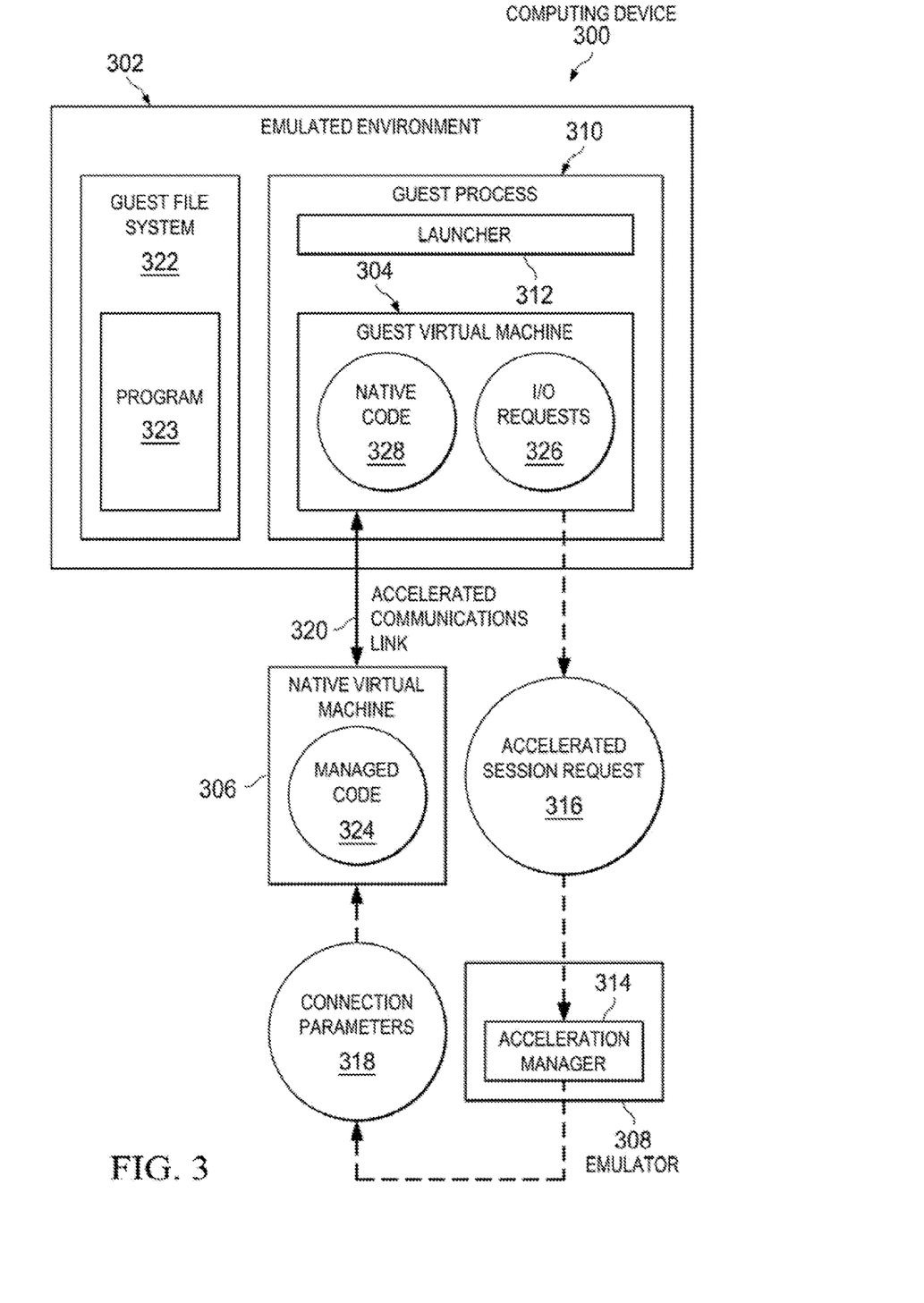
FIG. 3 is a block diagram of a data processing system configured for accelerating execution of Java™ programs in an emulated environment in accordance with an illustrative embodiment.

FIG. 3 is a block diagram of a computing device configured for accelerating execution of programs in an emulated environment in accordance with an illustrative embodiment. In particular, this disclosure is directed to accelerating the execution of Java™ programs in an emulated environment of a computing device, such as computing device 300. Computing device 300 is a computing device such as client 110 in FIG. 1.

In this non-limiting example in FIG. 3, computing device 300 utilizes a dual virtual machine configuration for accelerating the execution of Java™ programs running in emulated environment 302. Emulated environment 302 is an operating environment, such as a guest operating system, present within computing device 300. The first virtual machine, which is located within emulated environment 302, is guest virtual machine 304. The second virtual machine is native virtual machine 306. Native virtual machine 306 is a virtual machine executing in computing device 300 but located externally to emulated environment 302. A communications link established between guest virtual machine 304 and native virtual machine 306 enables the bulk of the Java™ execution to be performed without emulation overhead, thereby increasing the rate at which Java™ programs run in emulated environment 302.

Emulated environment 302 is created by emulator 308. Emulator 308 is a software program configured for emulating operating environments such as emulated environment 302. Emulated environment 302 may host one or more guest processes, such as guest process 310. Guest process 310 is an instance of a computer program that executes in emulated environment 302, and in which Java™ programs may run. For example and without limitation, guest process 310 may be the Eclipse Platform offered by IBM Corporation. In addition, guest process 310 may be any other process capable of running programs written in an object oriented programming language.

Guest process 310 includes launcher 312. Launcher 312 is an application launcher for creating and destroying guest virtual machine 304. In an illustrative example, launcher 312 may be a Java™ launcher, such as java.exe, which launches Java™ applications. Launcher 312 may initialize the Java™ runtime via a JNI_CreateJavaVM( ) function of the Java™ Invocation Application Program Interface. The JNI_CreateJavaVM( ) function provides a single location to intercept creation of a Java™ runtime in emulated environment 302. In an illustrative embodiment, the JNI_CreateJavaVM( ) function is capable of determining whether Java™ execution can be offloaded to emulator 308. In an illustrative embodiment, the JNI_CreateJavaVM( ) is extended to detect the ability to offload Java™ execution. This may be performed by a variety of methods, such as, for example and without limitation, implementing a user-specified command line argument, and automatic interaction with emulator 308 for detecting the presence of acceleration manager 314. Acceleration manager 314 is a component of emulator 308 configured for launching native virtual machine 306 and brokering the communication between guest virtual machine 304 and native virtual machine 306.

If Java™ execution cannot be offloaded from guest virtual machine 304, then Java™ execution completes within guest virtual machine 304, subject to a performance penalty. However, if Java™ execution can be offloaded to emulator 308, then guest virtual machine 304 sends accelerated session request 316 to emulator 308. Accelerated session request 316 is a request received by acceleration manager 314 for initiating the process of creating native virtual machine 306 and offloading Java™ execution.

In response to receiving accelerated session request 316, acceleration manager 314 launches native virtual machine 306 and sends to native virtual machine 306 connection parameters 318. Connection parameters 318 are parameters for establishing accelerated communications link 320. Connection parameters 318 may include information about emulator 308, emulated environment 302, and guest process 310. Native virtual machine 306 may use the information present in connection parameters 318 to optimize communication between native virtual machine 306 and guest virtual machine 304.

Connection parameters 318 also include a selection of a transport method. The selected transport method is used by native virtual machine 306 for forming accelerated communications link 320. Accelerated communications link 320 is a bidirectional communications channel for enabling the transfer of data between guest virtual machine 304 and native virtual machine 306. Non-limiting examples of transport methods serving as the basis of an accelerated communications link may include sockets, shared memory, direct memory access, named pipes, or any other currently existing or later developed data transport methods.

Native virtual machine 306 establishes accelerated communications link 320 in accordance with the communications method selected by acceleration manager 314, as identified in connection parameters 318. Accelerated communications link 320 is established between native virtual machine 306 and guest virtual machine 304 for the lifetime of guest virtual machine 304 and carries all subsequent I/O requests and JNI requests between guest virtual machine 304 and native virtual machine 306. The communication between guest virtual machine 304 and native virtual machine 306 is managed by emulator 308, thereby obviating the need for time consuming and complex handshakes. In addition, management of the communication between guest virtual machine 304 and native virtual machine 306 enables the selection of an optimal data transport method for serving as accelerated communications link 320.

When accelerated communications link 320 is established, guest virtual machine 304 is unblocked and begins forwarding JNI requests to native virtual machine 306 for execution. Native virtual machine 306 requests, from guest virtual machine 304, the appropriate Java™ application from guest file system 322 and the execution of Java™ programs may begin. Guest file system 322 is a database for the storage, organization, manipulation, and retrieval of data for use by a guest operating system, such as emulated environment 302.

Guest file system 322 includes program 323. Program 323 is one or more applications written in an object oriented programming language. In an illustrative embodiment, the object oriented programming language is Java™. Program 323 includes both managed code and native code. Execution of program 323 in emulated environment 302 in the presence of acceleration manager 314 enables the execution of the managed code and the native code in separate virtual machines for accelerating the execution of program 323.

The accelerated execution of Java™ programs, such as program 323, in emulated environment 302 is achieved by delegating to native virtual machine 306 the execution of managed code 324. Managed code 324 is computer program code that executes under the management of a virtual machine. In an illustrative embodiment, managed code 324 is program code of a Java™ application which is expressed in Java™ bytecode and encoded in a .class file. Managed code 324 is offloaded to native virtual machine 306 for execution.

Responsibility for the execution of native code 328 of a Java™ program remains with guest virtual machine 304. Native code 328 is computer program code of a Java™ application, such as program 323, which is executed directly on a central processing unit of computing device 300. Guest virtual machine 304 also continues to fulfill I/O requests 326 as is necessary for the execution of a Java™ program such as program 323. In this manner, because most Java™ programs execute far more managed code than native code, the execution of managed code 324 in native virtual machine 306 results in performance gains. Performance gains are realized because the execution of managed code 324 is unencumbered by emulation costs introduced by emulator 308.

Control of the life cycle of native virtual machine 306 by emulator 308 eliminates the need for complex discovery/handshake protocols that are needed in creating native virtual machine instances. In addition, since emulator 308 manages processes of both guest virtual machine 304 and native virtual machine 306, elaborate heartbeat monitoring is not required.

Furthermore, native virtual machine 306 can exploit access by emulator 308 to virtual hardware which further improves performance. For example, rather than sending buffers through an emulated TCP/IP stack, native virtual machine 306 can write directly to an appropriately prepared guest O/S memory. In some cases, emulator 308 may be configured to interact with guest operating system artifacts, such as files/sockets, which provide additional optimization opportunities for the execution of Java™ programs in emulated environment 302.

Figure 4:
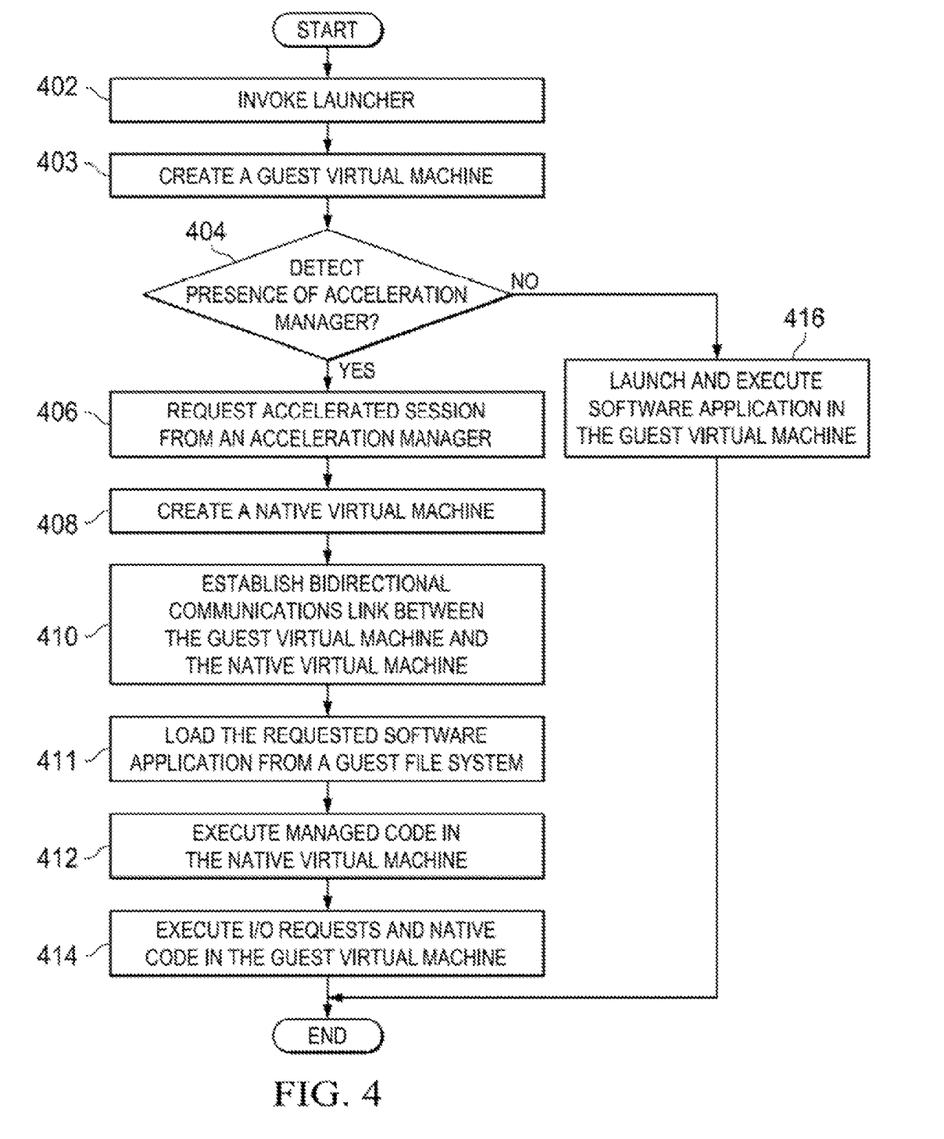
FIG. 4 is a flowchart of a process for accelerating execution of Java™ programs in accordance with an illustrative embodiment.

FIG. 4 is a flowchart of a process for accelerating execution of software applications written in an object oriented programming language in accordance with an illustrative embodiment. The process depicted in FIG. 4 may be performed by software components of a computing device hosting an emulated environment in which the software applications are running, such as emulated environment 302 in FIG. 3.

The process begins by invoking a launcher (step 402). The launcher is a launcher such as launcher 312 in FIG. 3. The launcher then creates a guest virtual machine (step 403). A determination is made as to whether a presence of an acceleration manager is detected (step 404). The acceleration manager is an acceleration manager such as acceleration manager 314 in FIG. 3. If the presence of an acceleration manager is detected, then the process requests an accelerated session from the acceleration manager (step 406).

A native virtual machine, such as native virtual machine 306 in FIG. 3, is created (step 408). Thereafter, an accelerated communications link is established between the native virtual machine and the guest virtual machine (step 410). The accelerated communications link enables the transport of JNI native code and managed Java™ code between the native virtual machine and the guest virtual machine.

The requested software application is then loaded from a guest file system (step 411). Thereafter, the managed code is forwarded to the native virtual machine for execution (step 412). JNI native code and/or I/O requests are returned to the guest virtual machine for execution (step 414), and the process terminates.

Returning to step 404, if the presence of an acceleration manager is not detected, then the software application is launched and executed in the guest virtual machine (step 416) and the process terminates. The execution of the software application in the guest virtual machine is subject to emulation overhead that results in a performance penalty.

Figure 5:
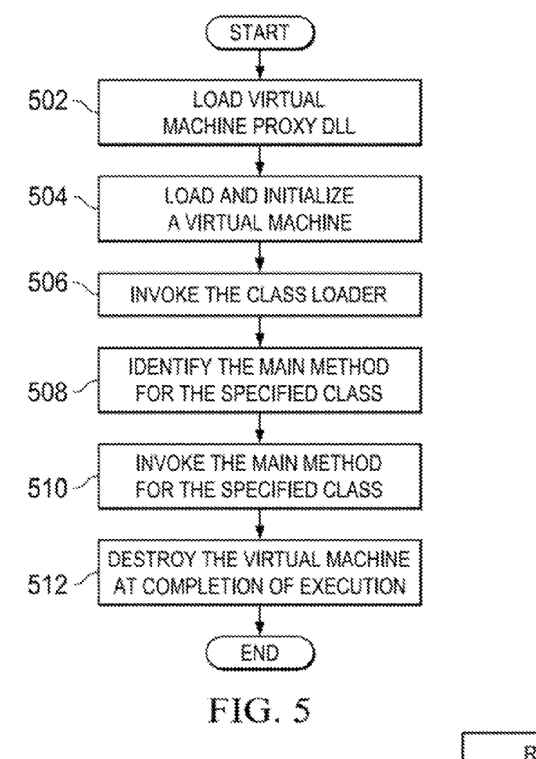
FIG. 5 is a flowchart of a process for launching a guest virtual machine in an emulated environment in accordance with an illustrative embodiment.

FIG. 5 is a flowchart of a process for launching a guest virtual machine in an emulated environment in accordance with an illustrative embodiment. The process depicted in FIG. 5 may be implemented by a software component such as launcher 312 in FIG. 3.

The process begins by loading a virtual machine proxy dll (step 502). A virtual machine is then loaded and initialized (step 504). In a non-limiting example, the invoker may perform this step by calling a JNI_CreateJavaVM function exported from the loaded virtual machine proxy dll.

The process then invokes a class loader (step 506). The class loader may be invoked by calling a FindClass method. The main method for the specified class is then identified (step 508). An example of a method that the invoker may call for identifying the main method is the GetStaticMethodID.

The main method for the specified class is then invoked (step 510). In an illustrative embodiment, the invoker may invoke the main method by calling CallStaticVoidMethod.

At the completion of execution, the guest virtual machine is destroyed (step 512) and the process terminates thereafter. The destruction of the guest virtual machine may be achieved by calling the DestroyJavaVM( ) method.

Figure 6:
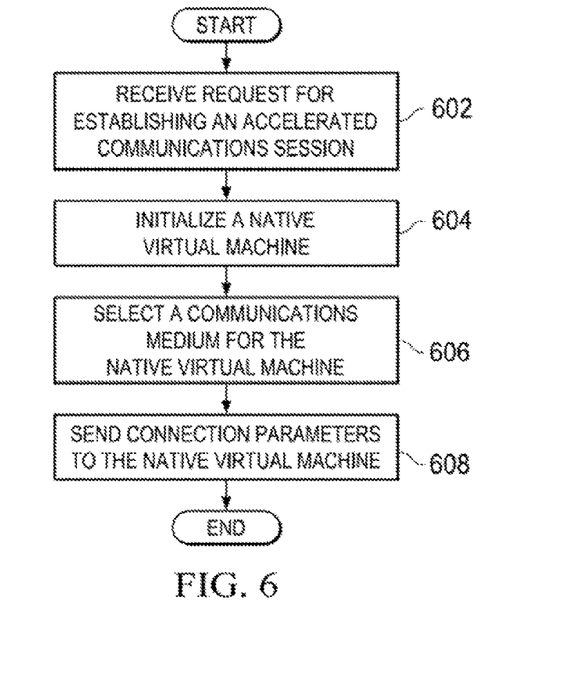
FIG. 6 is a flowchart of a process for launching a native virtual machine external to the emulated environment in accordance with an illustrative embodiment.

FIG. 6 is a flowchart of a process for launching a native virtual machine external to the emulated environment in accordance with an illustrative embodiment. The process depicted in FIG. 6 may be implemented in a software component such as acceleration manager 314 in FIG. 3.

The process begins by receiving a request for establishing an accelerated communications session (step 602). The request may be received from a guest virtual machine, such as guest virtual machine 304 in FIG. 3. In response, a native virtual machine is initialized (step 604). The native virtual machine is initialized external to the emulated environment, as is illustrated by native virtual machine 306 in FIG. 3.

A communications medium for the native virtual machine is selected (step 606). The selected communications medium forms the accelerated communications link that links the guest virtual machine and the native virtual machine.

Thereafter, the process sends connection parameters to the native virtual machine (step 608) and the process terminates. The connection parameters may then be used by the native virtual machine for establishing the accelerated communications link with the guest virtual machine.

Figure 7:
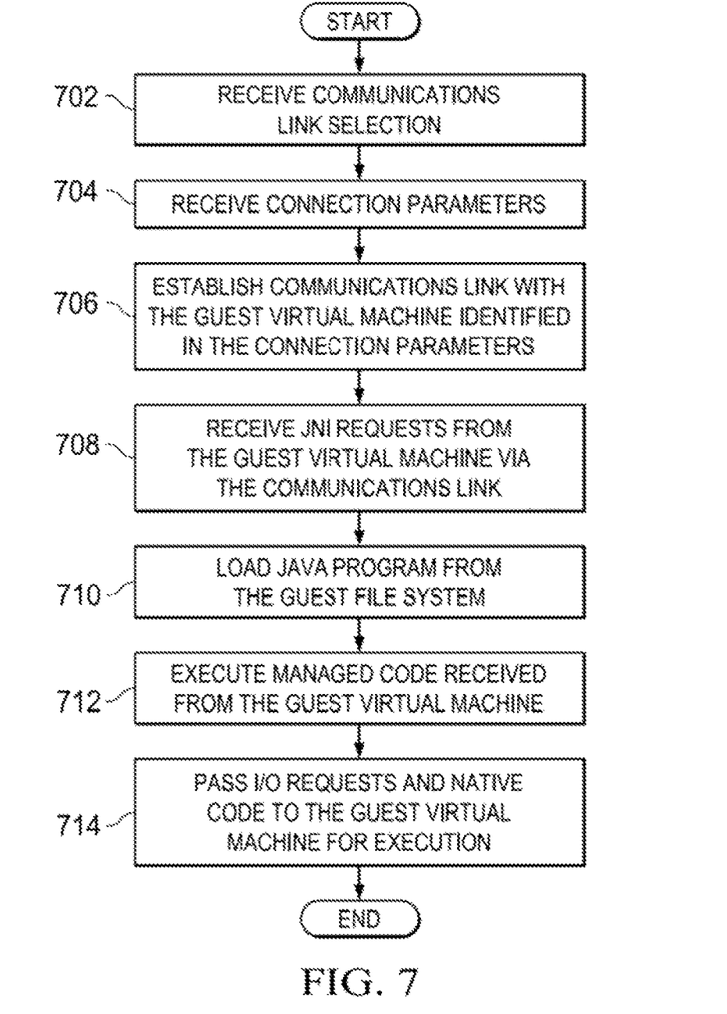
FIG. 7 is a flowchart of a process for operation of a native virtual machine in accordance with an illustrative embodiment.

FIG. 7 is a flowchart of a process for operation of a native virtual machine in accordance with an illustrative embodiment. The process depicted in FIG. 7 may be implemented in a software component, such as native virtual machine 306 in FIG. 3.

The process begins by receiving an accelerated communications link selection (step 702). The accelerated communications link selection is a connection parameter that is included in connection parameters 318 in FIG. 3. In addition, connection parameters are received (step 704). Thereafter, the accelerated communications link is established with a guest virtual machine identified in the connection parameters (step 706).

Once the accelerated communications link is established, JNI requests are received from the guest virtual machine via the accelerated communications link (step 708) and the Java™ program is loaded from the guest file system (step 710).

Managed code received from the guest virtual machine is executed (step 712) and I/O requests and JNI native code is passed back to the guest virtual machine for execution (step 714). The process terminates thereafter.

Figure 8:
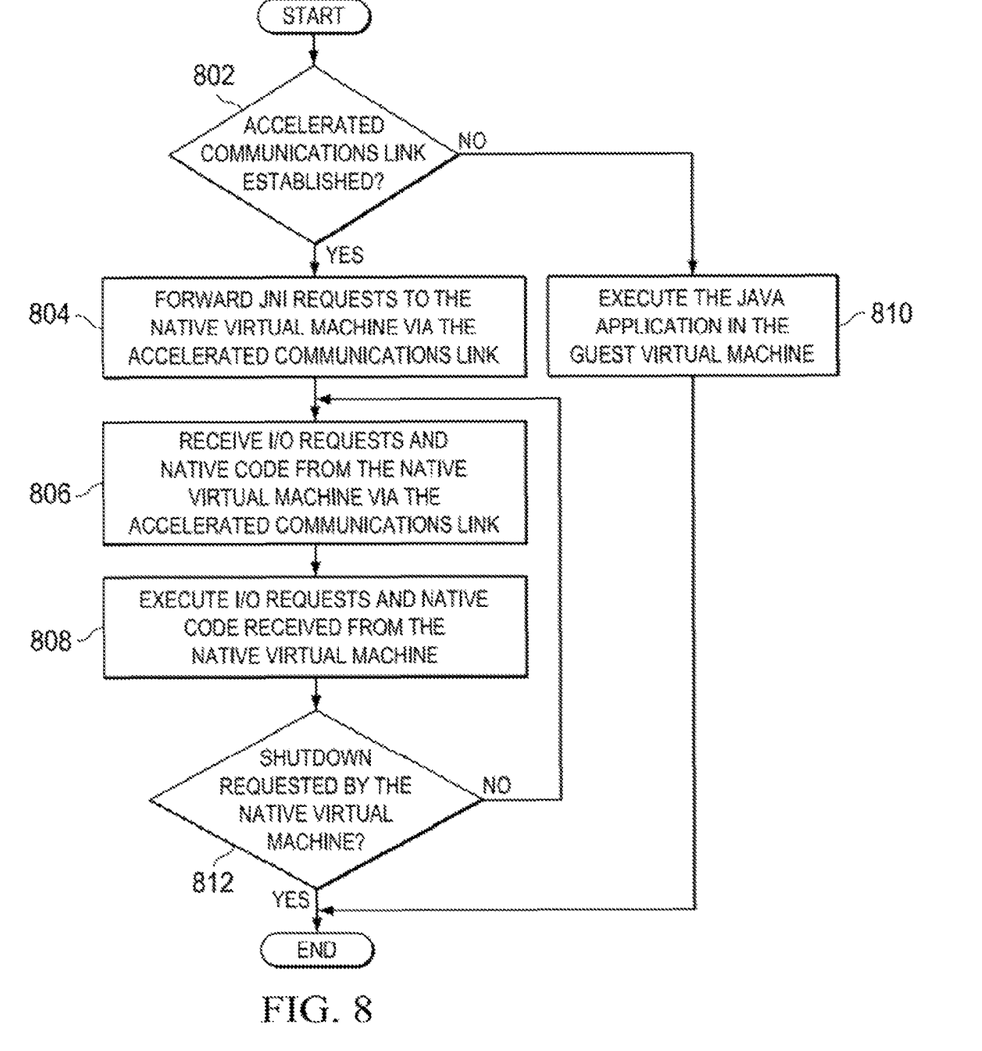
FIG. 8 is a flowchart of a process for operation of a guest virtual machine in accordance with an illustrative embodiment.

FIG. 8 is a flowchart of a process for operation of a guest virtual machine in accordance with an illustrative embodiment. The process in FIG. 8 may be implemented by a software component, such as guest virtual machine 304 in FIG. 3.

The process begins by making the determination as to whether an accelerated communications link has been established (step 802). If an accelerated communications link has been established, then JNI requests are forwarded to the native virtual machine via the accelerated communications link (step 804). The native virtual machine is a native virtual machine such as native virtual machine 306 in FIG. 3.

I/O requests and/or JNI native code are received from the native virtual machine via the accelerated communications link (step 806). Thereafter, the I/O requests and/or JNI native code received from the native virtual machine are executed (step 808). A determination is made as to whether shutdown is requested by the native virtual machine (step 812). If shutdown is requested, then the process terminates. However, if shutdown is not requested, then the process returns to step 806 and I/O requests and native code are received and executed until shutdown is requested.

Returning now to step 802, if the process makes the determination that an accelerated communications link is not established, then the process executes the application in the guest virtual machine (step 810) and terminates when the program execution terminates.

Thus, the illustrative embodiments described herein provide a computer implemented method, apparatus, and computer program product for accelerating execution of a program, written in an object oriented programming language, in an emulated environment. In response to receiving a request for an accelerated communications session from a guest virtual machine in the emulated environment, a native virtual machine is created outside the emulated environment but within a computing device hosting the emulated environment. Thereafter, an accelerated communications link is established between the guest virtual machine and the native virtual machine. The accelerated communications link enables a transfer of managed code between the guest virtual machine and the native virtual machine. The managed code is then executed by the native virtual machine.

The creation of a second virtual machine outside the emulated environment but within the computing device hosting the emulated environment accelerates the execution of the Java™ program by enabling managed code to be executed outside the emulated environment and thus it is unencumbered by an emulator. In addition, the use of a single computing device reduces the resources that would be required if the managed code were to be offloaded to a separate computing device. Also, performance gains are realized without having to alter Java™ programs.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable storage/recordable-type medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for accelerating execution of a program in an emulated environment, the computer implemented method comprising:

in response to an acceleration manager of an emulator that created the emulated environment receiving, from a guest virtual machine in the emulated environment, a request for an accelerated communications session of the program, creating a native virtual machine in a location external to the emulated environment, wherein the program comprises a managed code and a native code, wherein the program is written in an object oriented programming language, wherein the acceleration manager is a component of the emulator that is configure to launch the native virtual machine and broker communication between the native virtual machine and the guest virtual machine, and wherein the native virtual machine is located in a same computing device that is hosting the emulated environment;

establishing an accelerated communications link between the guest virtual machine and the native virtual machine, wherein the accelerated communications link is a bidirectional channel that enables a transfer of the managed code of the program to the native virtual machine;

forwarding the managed code to the native virtual machine;

executing the managed code in the native virtual machine; and executing the native code in the guest virtual machine.

2. The computer implemented method of claim 1, further comprising:

executing, in the guest virtual machine, one or more input/output requests.

3. The computer implemented method of claim 1, further comprising:

in response to detecting a presence of the acceleration manager, sending the request for the accelerated communications session.

4. The computer implemented method of claim 1, further comprising:

selecting a transport method to form the accelerated communications link.

5. The computer implemented method of claim 1, further comprising:

identifying connection parameters for establishing the accelerated communications link, wherein the connection parameters comprise data relating to one or more of: the emulated environment, a guest process executing in the emulated environment, and the emulator.

6. The computer implemented method of claim 1, further comprising:

invoking a launcher for initializing the guest virtual machine in the emulated environment.

7. The computer implemented method of claim 1, further comprising:

in response to receiving a shutdown request from the native virtual machine, terminating the guest virtual machine, wherein the request for termination is generated at completion of an execution of the program.

8. A computer program product for accelerating execution of a program in an emulated environment, the computer program product comprising:

a non-transitory computer recordable-type apparatus; and program instructions on the non-transitory computer recordable-type apparatus that when executed by a computer causes the computer to perform the functions of:

in response to an acceleration manager of an emulator that created the emulated environment receiving, from a guest virtual machine in the emulated environment, a request for an accelerated communications session of the program, creating a native virtual machine in a location external to the emulated environment, wherein the program comprises a managed code and a native code, wherein the program is written in an object oriented programming language, wherein the acceleration manager is a component of the emulator that is configure to launch the native virtual machine and broker communication between the native virtual machine and the guest virtual machine, and wherein the native virtual machine is located in a same computing device that is hosting the emulated environment;

establishing an accelerated communications link between the guest virtual machine and the native virtual machine, wherein the accelerated communications link is a bidirectional channel that enables a transfer of the managed code of the program to the native virtual machine;
forwarding the managed code to the native virtual machine;
executing the managed code in the native virtual machine; and
executing the native code in the guest virtual machine.

9. The computer program product of claim 8, the program instructions further comprising instructions for:
executing, in the guest virtual machine, one or more input/output requests.

10. The computer program product of claim 8, the program instructions further comprising instructions for:
in response to detecting a presence of the acceleration manager, sending the request for the accelerated communications session.

11. The computer program product of claim 8, the program instructions further comprising instructions for:
selecting a transport method to form the accelerated communications link.

12. The computer program product of claim 8, the program instructions further comprising instructions for:
identifying connection parameters for establishing the accelerated communications link, wherein the connection parameters comprise data relating to one or more of: the emulated environment, a guest process executing in the emulated environment, and the emulator.

13. The computer program product of claim 8, the program instructions further comprising instructions for:
invoking a launcher for initializing the guest virtual machine in the emulated environment.

14. The computer program product of claim 8, the program instructions further comprising instructions for:
in response to receiving a shutdown request from the native virtual machine, terminating the guest virtual machine, wherein the request for termination is generated at completion of an execution the program.

15. An apparatus for accelerating execution of a program in an emulated environment the apparatus comprising:
a bus system;
a memory connected to the bus system, wherein the memory includes computer usable program code; and
a processing unit connected to the bus system, wherein the processing unit executes the computer usable program code to:
in response to an acceleration manager of an emulator that created the emulated environment receiving, from a guest virtual machine in the emulated environment, a request for an accelerated communications session of the program, create a native virtual machine in a location external to the emulated environment, wherein the program comprises a managed code and a native code, wherein the program is written in an object oriented programming language, wherein the acceleration manager is a component of the emulator that is configure to launch the native virtual machine and broker communication between the native virtual machine and the guest virtual machine, and wherein the native virtual machine is located in a computing device hosting the emulated environment;
establish an accelerated communications link between the guest virtual machine and the native virtual machine, wherein the accelerated communications link is a bidirectional channel that enables a transfer of the managed code of the program to the native virtual machine;
forward the managed code to the native virtual machine;
execute managed code in the native virtual machine;
execute the native code in the guest virtual machine; and
in response to receiving a shutdown request from the native virtual machine, terminate the guest virtual machine, wherein the request for termination is generated at completion of an execution of the program.

16. The apparatus of claim 15, wherein the processing unit further executes the computer usable program code to:
execute one or more input/output requests in the guest virtual machine.

17. The apparatus of claim 15, wherein the processing unit further executes the computer usable program code to:
in response to detecting a presence of the acceleration manager, send the request for the accelerated communications session.

18. A system for accelerating execution of a program in an emulated environment, the system comprising
a processor;
a guest virtual machine, wherein the guest virtual machine is located in the emulated environment, wherein the guest virtual machine executes native code of the program, wherein the program comprises a managed code and a native code, and wherein the program is written in an object oriented programming language;
a native virtual machine, wherein the native virtual machine is located external to the emulated environment and located within a same computing device that is hosting the emulated environment, and wherein the native virtual machine executes managed code of the program;
an emulator that is configured to launch the native virtual machine and broker communication between the native virtual machine and the guest virtual machine;
an acceleration manager that is a component of the emulator that created the emulated environment, wherein the acceleration manager launches the native virtual machine, and wherein the acceleration manager sends connection parameters to the native virtual machine for establishing an accelerated communications link, wherein the acceleration manager creates the native virtual machine in response to receiving a request for an accelerated communications session of the program from the guest virtual machine; and
a plurality of instructions executing on the processor that cause the processor to:
establish the accelerated communications link between the guest virtual machine and the native virtual machine;
forward the managed code to the native virtual machine;
execute the managed code in the native virtual machine;
execute the native code in the guest virtual machine; and
in response to receiving a shutdown request from the native virtual machine, terminate the guest virtual machine, wherein the request for termination is generated at completion of an execution of the program.

19. The system of claim 18, the plurality of instructions further comprising instructions that cause the processor to:
initiate, via a launcher, the guest virtual machine in the emulated environment.

20. The system of claim 18, the plurality of instructions further comprising instructions that cause the processor to:
create, via the emulator, the emulated environment.

* * * * *